United States Patent
Gottmann et al.

(10) Patent No.: US 7,931,997 B2
(45) Date of Patent: Apr. 26, 2011

(54) MULTI-MATERIAL HIGH TEMPERATURE FUEL CELL SEALS

(75) Inventors: Matthias Gottmann, Sunnyvale, CA (US); David Weingaertner, Sunnyvale, CA (US); Dien Nguyen, San Jose, CA (US)

(73) Assignee: Bloom Energy Corporation, Sunnyvale, CA (US)

( * ) Notice: Subject to any disclaimer, the term of this patent is extended or adjusted under 35 U.S.C. 154(b) by 0 days.

(21) Appl. No.: 12/382,173

(22) Filed: Mar. 10, 2009

(65) Prior Publication Data

US 2009/0233154 A1 Sep. 17, 2009

Related U.S. Application Data

(60) Provisional application No. 61/064,566, filed on Mar. 12, 2008.

(51) Int. Cl.
*H01M 2/08* (2006.01)
*H01M 4/82* (2006.01)

(52) U.S. Cl. ........ 429/508; 429/510; 429/460; 29/623.2

(58) Field of Classification Search .................. None
See application file for complete search history.

(56) References Cited

U.S. PATENT DOCUMENTS

| | | | |
|---|---|---|---|
| 3,615,851 A | 10/1971 | Eysel | |
| 5,589,285 A | 12/1996 | Cable et al. | |
| 5,948,221 A | 9/1999 | Hsu | |
| 5,972,285 A | 10/1999 | Knott | |
| 6,096,451 A * | 8/2000 | Shiratori et al. | |
| 6,280,869 B1 | 8/2001 | Chen | |
| 6,302,402 B1 | 10/2001 | Rynders et al. | |
| 6,492,053 B1 | 12/2002 | Donelson et al. | |
| 6,532,769 B1 | 3/2003 | Meinhardt et al. | |
| 6,605,316 B1 | 8/2003 | Visco et al. | |
| 6,635,375 B1 | 10/2003 | Geisbrecht et al. | |
| 6,692,859 B2 | 2/2004 | Mukerjee et al. | |
| 6,740,441 B2 | 5/2004 | Jacobson et al. | |
| 6,902,798 B2 | 6/2005 | Ghosh et al. | |
| 7,144,651 B2 | 12/2006 | Finn et al. | |
| 2002/0055028 A1 | 5/2002 | Ghosh et al. | |
| 2003/0157386 A1 * | 8/2003 | Gottmann et al. | 429/13 |
| 2003/0203267 A1 * | 10/2003 | Chou et al. | 429/35 |
| 2003/0215689 A1 | 11/2003 | Keegan | |
| 2004/0072039 A1 * | 4/2004 | Jankowski et al. | 429/19 |
| 2005/0175882 A1 * | 8/2005 | Sasahara et al. | 429/36 |
| 2006/0246333 A1 * | 11/2006 | Schaevitz et al. | 429/26 |
| 2007/0003821 A1 * | 1/2007 | Belchuk | 429/44 |
| 2007/0037058 A1 * | 2/2007 | Visco et al. | 429/246 |
| 2008/0026280 A1 * | 1/2008 | Thompson et al. | 429/35 |
| 2009/0065042 A1 * | 3/2009 | Reynolds | 136/244 |

OTHER PUBLICATIONS

U.S. Appl. No. 12/292,078, filed Nov. 12, 2008, Kumar et al.

* cited by examiner

*Primary Examiner* — Patrick Ryan
*Assistant Examiner* — Ladan Mohaddes
(74) *Attorney, Agent, or Firm* — The Marbury Law Group, PLLC

(57) ABSTRACT

A fuel cell stack includes a plurality of fuel cells, a plurality of interconnects and a multi-material seal comprising a first seal material and a second seal material, where the second seal material first forms an effective seal at a higher temperature than the first seal material.

16 Claims, 2 Drawing Sheets

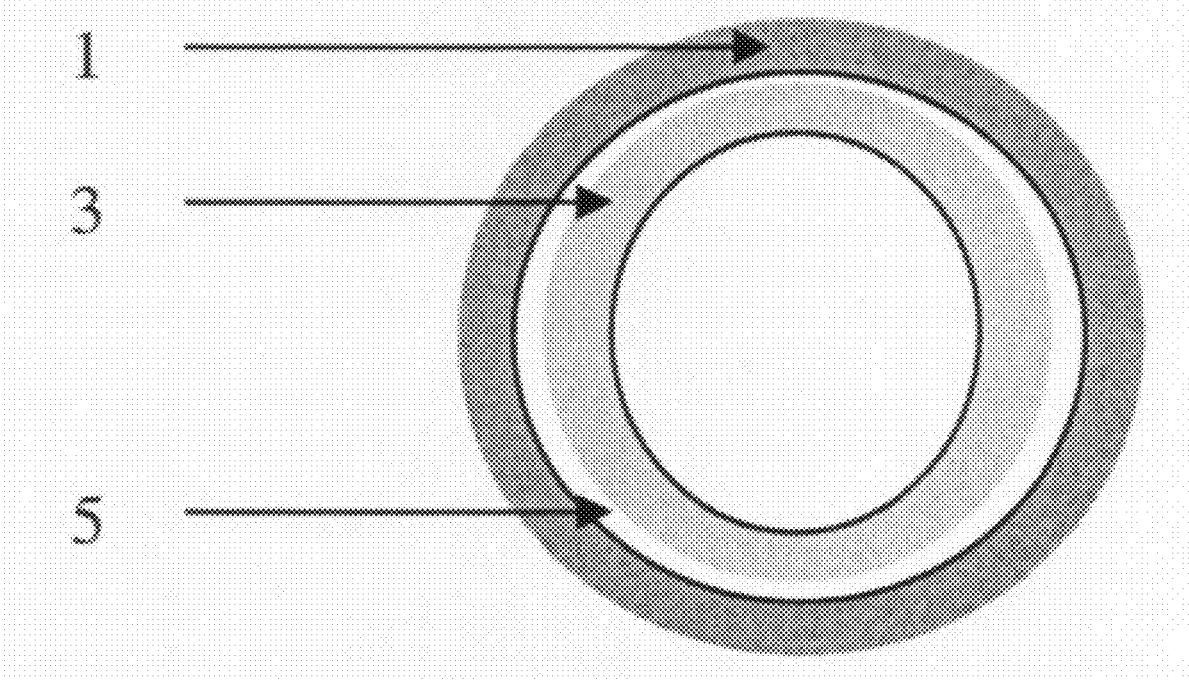

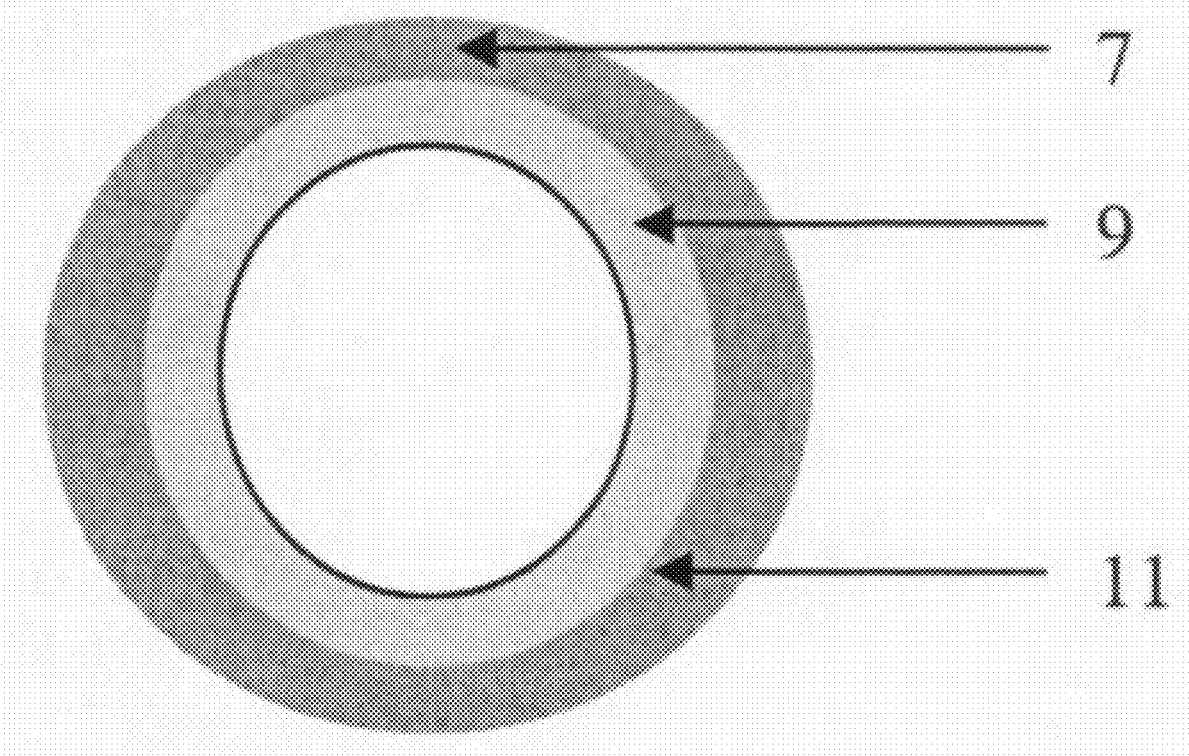

US 7,931,997 B2

MULTI-MATERIAL HIGH TEMPERATURE FUEL CELL SEALS

CROSS-REFERENCE TO RELATED PATENT APPLICATIONS

The present application claims benefit of U.S. provisional application 61/064,566, filed Mar. 12, 2008, which is incorporated herein by reference in its entirety.

FIELD OF THE INVENTION

The present invention is generally directed to fuel cell components and more specifically to multi-material high temperature fuel cell seals.

BACKGROUND OF THE INVENTION

Fuel cells are electrochemical devices which can convert energy stored in fuels to electrical energy with high efficiencies. High temperature fuel cells include solid oxide and molten carbonate fuel cells. These fuel cells may operate using hydrogen and/or hydrocarbon fuels. There are classes of fuel cells, such as the solid oxide reversible fuel cells, that also allow reversed operation, such that water or other oxidized fuel can be reduced to unoxidized fuel using electrical energy as an input.

In a high temperature fuel cell system such as a solid oxide fuel cell (SOFC) system, an oxidizing flow is passed through the cathode side of the fuel cell while a fuel flow is passed through the anode side of the fuel cell. The oxidizing flow is typically air, while the fuel flow is typically a hydrogen-rich gas created by reforming a hydrocarbon fuel source. The fuel cell, typically operating at a temperature between 750° C. and 950° C., enables the transport of negatively charged oxygen ions from the cathode flow stream to the anode flow stream, where the ions combine with either free hydrogen or hydrogen in a hydrocarbon molecule to form water vapor and/or with carbon monoxide to form carbon dioxide. The excess electrons from the negatively charged ions are routed back to the cathode side of the fuel cell through an electrical circuit completed between anode and cathode, resulting in an electrical current flow through the circuit.

Fuel cell stacks are frequently built from a multiplicity of cells in the form of planar elements, tubes, or other geometries. Fuel cell stacks, particularly those with planar geometry, often use seals between electrolyte and interconnect surfaces to contain fuel and air and at various locations within the stack. While it is desirable for seals to be effective at start up temperatures to prevent escape (and potential ignition) of fuel gasses, these seals must maintain their operating integrity at high operating temperatures and an oxidizing, reducing, or mixed (i.e., oxidizing on one side on one side of the seal and reducing on the other) environment. Expansion and contraction of fuel cell stack components (including seals) due to thermal cycling or compression should not result in damage to of any of the components during a seal's expected life.

Many types of seals used at elevated temperatures, such as brazes and metal gaskets, often have a limited life, tolerating only a relatively few number of thermal cycles before they fail due to differences in the coefficients of thermal expansion that result in mechanical stresses that can lead to failure of the seal or the components of the assembly. Some assemblies are difficult to seal with brazes or gaskets because of operating conditions or material incompatibilities. Also, brazes and metal gaskets often present difficulties and high costs of fabrication and assembly due to the tighter tolerances which are required, in flatness for example.

Many compliant seals, such as elastomeric O-rings and gaskets, form effective seals at start up temperatures, do not crack and tend to absorb stresses in an assembly that arise from thermal expansion and compression. However, these seals cannot be used in high temperature conditions because the elastomeric materials used in them decompose, degrade, or oxidize at high temperatures.

Glass and glass ceramic compounds have been shown to be able to provide robust high temperature seals. However, they have a major shortcoming in that they are ineffective at forming a hermetic seal until the stack reaches their softening temperature. Selection of the glass or glass ceramic composition inherently defines the melting characteristics and viscosity of the seal as a function of temperature. Thus, the temperature at which an effective seal is initially able to form can be tailored based on composition. However, if a glass or glass ceramic is used with a low enough softening temperature that an effective seal is able to form at relatively low temperatures, the viscosity of the glass at typical SOFC operating conditions may be low enough that the system pressure can push the seal out of position. Conversely, if a glass or glass ceramic is used with a high enough softening temperature that an effective seal is able to be maintained at typical SOFC operating conditions, the seal's relatively high softening temperature prevents it from forming an effective seal early in the SOFC's heating cycle.

Failure to establish and maintain an effective seal during the heating cycle of a SOFC allows the fuel gasses to escape. These escaping gasses can ignite causing local heating and potentially changing the composition and/or properties of the sealing materials used.

SUMMARY OF THE INVENTION

One aspect of the present invention is a method of sealing a fuel cell system comprising providing a first seal material that forms an effective seal at some temperature; and providing a second seal material that first forms an effective seal at some higher temperature.

A second aspect of the present invention provides a fuel cell stack comprising a plurality of fuel cells, a plurality of interconnects and a multi-material seal comprising a first seal material and a second seal material, wherein the second seal material first forms an effective seal at a higher temperature than the first seal material.

BRIEF DESCRIPTION OF THE DRAWINGS

FIG. 1 is a top view of a exemplary donut seal where a gap is defined between two seal members.

FIG. 2 is a top view of a second exemplary donut seal where two seal members abut.

DETAILED DESCRIPTION OF THE INVENTION

As used herein, the term "forming an effective seal" does not require the formation of a perfectly hermetic seal. Rather, forming an effective seal indicates that a seal member is defining the boundary of a pressure differential or is forming a physical deterrent to substantial gas flow from one side of the seal to the other.

As used herein, the use of the terms "inside" or "inner" to describe the position of one seal member relative to another indicates that the inside or inner seal member is at a position closer to the interior of the sealed area. Conversely, the outer or outside member is at position closer to the outside of the sealed area.

As used herein, the term "typical SOFC operating temperature" includes a temperature that falls within the range of 750° C. to 950° C., inclusive.

As used herein, the term "SOFC heating cycle" refers to the process of heating an SOFC from a starting temperature below a SOFC operating temperature to the operating temperature. An initial SOFC heating cycle refers to the first heating cycle after manufacture during which the seals between SOFC stack components are set into their operational shape.

As used herein, the term "softening point" refers to the temperature at which the viscosity of a glass or a glass ceramic material reduces to the point where the material can form an effective seal.

As used herein, the temperature at which a seal material is first capable of effectively forming a seal is the temperature below which a material's high viscosity or diminished elasticity prevents it from forming an effective seal.

As used herein, a seal member's thickness is the distance between two elements in contact with the seal member, contact with which forms the seal. In the case of a SOFC, the two elements may be two planar stack elements that form a top and bottom of the seal member.

As used herein, a seal member's width is the dimension of the seal member that is defined by the inside of the sealed area and the outside of the sealed area.

As used herein, the term elastomeric materials refers to materials that deform reversibly under stress. These materials may be organic polymers, such as rubber, or inorganic polymers, such as silicone rubber.

The inventors realized that a plurality of seals with dissimilar compositions and varying temperature-dependent performance characteristics can be utilized together to form multi-material fuel cell seals that are effective across a wide temperature range.

A multi-material seal comprises a plurality of seal materials with at least a first seal material that is first capable of forming an effective seal at some temperature and a second seal material that is first capable of forming an effective seal at some higher temperature. As long as the above condition is met, it is not necessary for every seal material in the plurality of seal materials to have a distinct composition.

One type of multi-material seal of the embodiments of the present invention is comprised of a single seal member. In this type of seal, a plurality of seal materials are processed together to form a single seal member. The processes of processing seal materials to form seal members, such as dispensing, tape casting and tape punching, are numerous and well known in the art. Any suitable process for forming seal members from seal materials can be used.

Another type of multi-material seal of the embodiments of the present invention is comprised of multiple seal members. An example of this type of seal is illustrated in FIG. 1, which shows two distinct seal members: an outer ring (1) and an inner ring (3). In this type of seal, any two members may be composed of distinct materials with a different softening points, or a plurality of seal materials may be processed together to form each seal member. In one embodiment, the seal materials comprise glass or glass ceramic materials with a different softening point. In another embodiment, the high temperature seal material comprises a glass or a glass ceramic, while the low temperature seal material comprises an elastomeric material which is evaporated at or below the SOFC operating temperature.

Multi-material seals of the present invention can be constructed in any geometric shape necessary for their application. For example, a SOFC stack may contain multiple fuel cells, manifolds for fuel and air, and various internal interconnects. At the juncture of each of these components, a distinctively shaped seal may be required to maintain an effective seal at typical operating temperatures. Exemplary possible geometric shapes include rings (i.e., donut), strips, rectangles (i.e., windows) or any combination thereof. The seals may be located between adjacent stacks, between a stack and an adjacent manifold, such as a fuel manifold, or between components within a single stack, such as between an electrolyte or electrode of one cell and an adjacent interconnect.

Irrespective of the geometric shape adopted, if a multi-material seal of the embodiments of the present invention is constructed of two or more seal members and if one seal member is capable of forming an effective seal at a lower temperature than the others, then the seal member capable of forming an effective seal at the lowest temperature is preferably but not necessarily constructed such that it is thicker than the remaining seal members. This thickness differential allows the seal member capable of forming an effective seal at the lowest temperature to have the best contact with the elements to be sealed during the initial heat up of the stack. Exemplary relative thicknesses of seal members would be approximately 150-200 microns, such as about 170 microns for the seal member capable of forming an effective seal at the lowest temperature and approximately 125 to 175 microns, such as 150 microns for seal members capable of forming effective seals at higher temperatures. In general, the thickness difference between the seals can be between 5 and 20%. The seal member(s) can have width of approximately 5 to 10 mm.

Also irrespective of the geometric shape adopted, each individual of the plurality of seal members can be positioned relative to one another in such a way that one seal member is positioned inside another seal member. In certain preferred embodiments, the plurality of seal members comprise a first seal member and a second seal member wherein the first seal member is positioned inside the second seal member. These embodiments are not meant to be limiting and multi-material seals with three or more seal members can be constructed according to the present invention.

Irrespective of the relative positioning of individual seal members adopted above, any two seal members can be positioned such that they are in contact (i.e., abut) or positioned such that a gap is defined between them.

An illustration of an exemplary concentric ring seal where a gap is defined between two seal members is found in FIG. 1. As seen in this figure, a gap is shown at position 5 between an outer seal member 1 and an inner seal member 3.

An illustration, of an exemplary concentric ring seal with abutting seal members is found in FIG. 2. As seen in this figure, contact at position 11 occurs between an outer seal member 7 and an inner seal member 9.

Multi-material seals can be constructed according to the embodiments of the present invention where individual members of a plurality of seal members are positioned relative to one another such that any combination of the above two relative positioning conditions (i.e., abutting and separated) is utilized. For example, a three member multi-material seal can be constructed according to the embodiments of the present invention in any of the following three ways: no gaps are defined between any two adjacent seal members; two seal members abut but a gap is defined between them and the third member; or gaps are defined between all adjacent members.

In related embodiments, the abutting seal members can be selected such that the interface of the two members softens at a temperature below the softening point of either seal member. In further related embodiments, the composition of the abutting seal members can be selected such that a eutectic would form at the interface between them; thus forming a three member seal from two members (e.g. high softening temperature first member, low softening temperature by eutectic, high softening temperature second member).

In other related embodiments, the composition of abutting members can be selected such that the interface of the two members softens at a temperature between the softening points of the abutting members. In still other related embodiments, the composition of abutting members can be selected such that the interface of the two members softens at a temperature higher than the softening point of either seal member.

Thus for embodiments where no gap is defined between at least two adjacent seal materials, it is possible that the softening point of each of the abutting seal member could be below, similar to, or above the ultimate temperature at which a seal is to be effectively maintained at the contact position.

One embodiment of a multi-material high temperature fuel cell seal according to the present invention comprises a first glass or glass ceramic seal material and a second glass or glass ceramic seal material, where the second material has a softening point at a higher temperature than that of the first material. The second material may also be capable of maintaining an effective seal at a temperature above which the first material fails.

In related embodiments, the composition of the first glass or glass ceramic material is selected such that the first material softens (i.e., becomes capable of forming an effective seal) at some temperature during the heating cycle of a SOFC. Such a material may be unsuitable for use as a seal material in a single-material high temperature fuel cell seal. This is because a glass's or a glass ceramic's viscosity diminishes with increased temperature and a material that softens at a relatively low temperature may not be viscous enough at typical SOFC operating temperatures to maintain an effective seal. Thus, for use as a high temperature fuel cell seal, the first material is used together with a second material whose composition is selected such that the following two criteria are met. First, the second material softens (i.e., become capable of forming an effective seal) at some temperature within the range of temperatures defined by the softening temperature of the first glass ceramic and the temperature at which the first material looses sufficient viscosity to maintain an effective seal. Second, the second material remains sufficiently viscous at typical SOFC operating temperatures that it is capable of maintaining an effective seal at such a temperature.

When utilized in a SOFC stack, the first material softens and effectively seals the SOFC at some relatively low temperature in the heating cycle. At a higher temperature in the heating cycle, the second material softens to the point of being able to form an effective seal for the SOFC. At the same or an even further elevated temperature, the first material loses sufficient viscosity to maintain an effective seal. At this temperature and above, the second material solely maintains the effective seal for the SOFC.

Examples of materials envisioned for use in the present invention include higher temperature modified borosilicate glasses with a high content of BaO and $Al_2O_3$ and lower temperature pure borosilicate glasses, although any other glass or glass ceramic material with a suitable viscosity profile can be used.

In seals constructed of first and second seal members, each composed of different glass or glass ceramic seal materials, the two members can be oriented such that either the lower or higher effective seal temperature material is at the inside position. Preferred embodiments of this example place the higher temperature material inside the lower temperature material.

In a second embodiment of the invention, the multi-material seal comprises a plurality of seal materials with at least a first seal member composed of an elastomeric material that is capable of maintaining an effective seal at or near room temperature and a second seal material that is first capable of forming an effective seal at some elevated temperature. As described above, the seals of this example can also be of any geometric shape necessary.

In certain preferred embodiments, the elastomeric seal material is an O-ring or gasket material comprising a polymer with an evaporation temperature of at least 200 C. For example, the polymer comprises a silicone rubber. The second seal material may be a glass or a glass ceramic material, as described above with respect to the first embodiment. The composition of the glass or glass ceramic is selected such that it retains sufficient viscosity at a typical SOFC operating temperature that it is able maintain an effective seal at such a temperature. There may be two or more different glass or glass ceramic material seals described in the first embodiment used together with the elastomeric seal.

Irrespective of the geometric configuration adopted, the two seal members can be positioned relative to one another such that either the elastomeric material is located inside the second seal material or the second seal material is inside the elastomeric material. In certain preferred embodiments, the second seal material is positioned inside the elastomeric material.

Irrespective of the relative positioning of the elastomeric and second seal materials adopted above, in this example any two seal members can be positioned relative to one another such that they are in contact (i.e., abut) or positioned such that a gap is defined between them. The preferred orientation of this example is such that a gap is defined between the elastomeric member and the second seal member. Thus, the elastomeric and the high temperature seals may have the configurations described with respect to the first embodiment.

When utilized in a SOFC stack, the elastomeric o-ring or gasket can effectively seal the SOFC at or near room temperature and maintain an effective seal through lower temperatures of the initial heating cycle. At some temperature in the heating cycle, another glass or glass ceramic seal material softens to the point of being able effectively seal the SOFC. Also at some point in the heating cycle, the elastomeric o-ring or gasket thermally degrades, decomposes, or oxidizes to the point where it is unable to maintain an effective seal. At typical operating temperatures, the other glass or glass ceramic seals or seals maintain the effective seal for the SOFC. Thus, the elastomeric seal is thermally removed from the stack by evaporation, decomposition, etc., during the initial stack heat-up (i.e., during the initial SOFC heating cycle) such that only the glass or glass ceramic seal(s) remain in the stack after the initial heat-up.

The foregoing description of the invention has been presented for purposes of illustration and description. The methods and devices illustratively described herein may suitably be practiced in the absence of any element or elements, limitation or limitations, not specifically disclosed herein. Thus, for example, the terms "comprising", "including," "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the invention embodied therein herein disclosed may be resorted to by those skilled in the art, and that such modifications and variations are considered to be within the scope of this invention. It is intended that the scope of the invention be defined by the claims appended hereto, and their equivalents.

What is claimed is:

1. A method of sealing a fuel cell stack, said method comprising:
    providing a first seal material and a second seal material into the fuel cell stack;
    then forming a first effective seal at a first temperature with the first seal material between first and second adjacent fuel cell stack components; and
    then forming a second effective seal at a second temperature with the second seal material between the adjacent fuel cell stack components;
    wherein said second seal material is capable of maintaining an effective seal at temperatures within a range of about 750° C. to about 950° C., said second temperature is higher than said first temperature, and each of the first and the second seal materials are in contact with both adjacent fuel cell stack components; and
    wherein said first seal material comprises an elastomeric seal material.

2. The method of claim 1, wherein the first and the second seal materials comprise separate first and second seal members.

3. The method of claim 2, wherein said first seal member has a greater thickness than said second seal member.

4. The method of claim 2, wherein said first and said second seal materials are positioned relative to each other such that said second seal material is positioned closer to a sealed area.

5. The method of claim 2, wherein said first and said second seal materials are positioned relative to each other such that said first seal material is positioned closer to a sealed area and wherein said second seal material has a higher softening point than the first seal material.

6. The method of claim 2, wherein said first seal material and said second seal material are positioned relative to each other such that a gap is defined between the first and the second seal materials.

7. The method of claim 2, wherein said first seal material and said second seal material abut each other.

8. The method of claim 2, wherein said second seal material first forms a seal at a temperature below the temperature at which said first seal material fails to be capable of maintaining an effective seal.

9. The method of claim 1, wherein said second seal material comprises a glass or a glass ceramic seal material.

10. The method of claim 9, wherein said second seal material softens at a temperature below the temperature at which said first seal material thermally degrades, decomposes, or oxidizes to a point where the first seal material is no longer capable of maintaining an effective seal.

11. The method of claim 10, wherein said second seal material is a glass ceramic seal material capable of maintaining an effective seal at a temperature above said first seal member failure temperature.

12. The method of claim 10, wherein the first seal material is removed from the fuel cell stack at an elevated temperature.

13. The method of claim 1, wherein the first fuel cell stack component is an interconnect or electrolyte and the second fuel cell stack component is an adjacent interconnect or electrolyte.

14. The method of claim 1, wherein the first fuel cell stack component is an interconnect or electrolyte and the second fuel cell stack component is an adjacent manifold.

15. The method of claim 1, wherein the first fuel cell stack component is a solid oxide fuel cell electrolyte located in a fuel cell stack and the second fuel cell stack component is an interconnect.

16. The method of claim 1, wherein the first and second seal materials form a ring shaped seal.

* * * * *